United States Patent [19]

Wrulich et al.

[11] Patent Number: 4,555,143

[45] Date of Patent: Nov. 26, 1985

[54] APPARATUS FOR CUTTING ROCK

[75] Inventors: Herwig Wrulich; Otto Schetina, both of Zeltweg; Gottfried Siebenhofer, Fohnsdorf; Wilfried Maier, Zeltweg, all of Austria

[73] Assignee: Voest-Alpine Aktiengesellschaft, Vienna, Austria

[21] Appl. No.: 594,524

[22] Filed: Mar. 29, 1984

[30] Foreign Application Priority Data

Apr. 11, 1983 [AT] Austria ................. 1281/83

[51] Int. Cl.[4] .................. E21C 35/22; E21C 37/06
[52] U.S. Cl. ......................... 299/81; 299/69; 299/85; 299/94
[58] Field of Search ............ 299/10, 81, 85, 17, 299/69, 94; 137/624.11, 624.13, 625.11, 625.12, 627; 173/116; 175/67

[56] References Cited

U.S. PATENT DOCUMENTS

| 3,536,451 | 10/1970 | Ludwin | 137/624.13 |
| 3,741,316 | 6/1973 | Alajouanine | 173/116 |
| 4,289,357 | 9/1981 | Hintermann et al. | 299/81 |
| 4,333,687 | 6/1982 | Barnstorf | 299/81 |
| 4,456,306 | 6/1984 | Wrulich et al. | 299/81 |

FOREIGN PATENT DOCUMENTS 1126766  6/1982  Canada .................. 299/81

Primary Examiner—Stephen J. Novosad
Assistant Examiner—Bruce M. Kisliuk
Attorney, Agent, or Firm—Cushman, Darby & Cushman

[57] ABSTRACT

Figure 2:
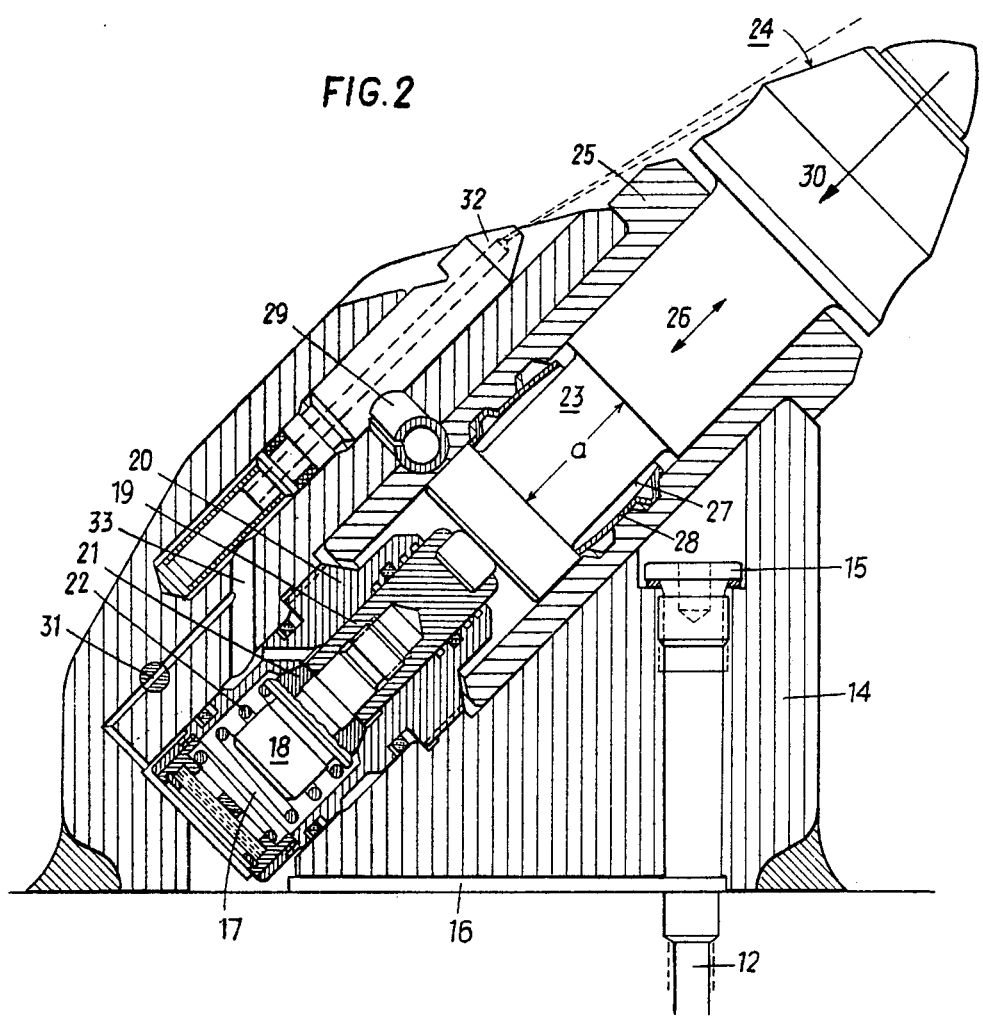

For cutting rock by means of cutting head (1) having its bits (24) cooperating over a limited axial shifting stroke (a) with a cylinder-piston-aggregate, for example a valve (18), it is proposed to intermittently subject the cylinder-piston-aggregate to the action of pressurized fluid, thus exposing the bit (24) during its engaging the rock to percussion forces. During the phases lacking any action of pressurized fluid onto the cylinder-piston-aggregate, the bit (24) shall be pushed into its starting position. This embodiment can be realized with both hydraulic and pneumatic cylinder-piston-aggregates, noting that in case of an embodiment having a hydraulic cylinder-piston-aggregate it is preferred to design this cylinder-piston-aggregate as a valve (18) which simultaneously provides the possibility to expel pressurized liquid via a spraying nozzle (32) onto the mine face. (FIG. 2)

13 Claims, 4 Drawing Figures

APPARATUS FOR CUTTING ROCK

The invention refers to a process for cutting rock by means of a cutting head having its bits cooperating over a limited axial shifting stroke with a cylinder-piston-aggregate, in particular a valve, as well as to an apparatus for performing this process with a partial cut cutting machine, the cutting arm of which has at least one cutting head being equipped with bits supported within bit holders for being axially shifted in the direction of their axes over a limited stroke. It is already known to vibrate the bits, for example by means of ultrasonics, for improving the cutting efficiency and for reducing the energy consumption. Such constructions are, however, relatively expensive and somewhat subject to disturbance on account of the high mechanical stress of the vibration emitters. It is already known to arrange bits within a bit holder for a limited axial shifting stroke, thereby utilizing the shifting stroke of the bit penetrating the rock to be excavated for controlling the supply of water to water nozzles directing the water against the bits or against the facing. With these known embodiments it was intended to eject water only if the bits were actually in contact with the rock to be excavated.

The invention now aims at providing a process for cutting rock in which the bits are imparted in addition to the rotating movement of the cutting head an impact movement for facilitating the loosening work. For achieving such a cutting work in combination with percussion work, the process according to the invention makes use of a cutting head equipped with bits being axially shiftable over a limited stroke and cooperating with a cylinder-piston-aggregate, and the invention essentially consists in that the cylinder-piston-aggregate is intermittently subjected with pressurized fluid and is thereby effecting a pressure stoke of the bit into an outer axially shifted position and is pressed by the bit into its starting position during the phases lacking subjection to pressurized fluid.

On account of intermittently subjecting the cylinder-piston-aggregate, which can, for example, be formed of a valve, to the action of pressurized fluid, the bit can be hit at the mine face into the rock to be loosened in an intermittent manner after having entered the rock. As soon as the cylinder-piston-aggregate is no more subjected to pressure, the bit can be shifted for the predetermined axial stroke into its retracted position under the action of the cutting pressure, whereupon the bit can again be hit against the mine face by application of the pressurized fluid. Preferably the process according to the invention is performed such that a cylinder-piston-aggregate designed as a valve is used which is acted upon by the pressurized fluid in the closing sense, the valve shaft being moved into the closed position of the valve against the action of the axial component of the cutting force. With such a construction, the cross section becoming effective in the closing sense of the valve must be sufficiently great to make sure that the valve becomes closed and the bit is thus moved in direction to the mine face against the action of the cutting force whenever pressurized fluid is supplied. For the purpose of opening such a valve whenever the source of pressurized fluid is shut off, the volume of liquid displaced during the opening stroke of the valve is preferably forced in direction to the bit or the mine face, respectively, via at least one nozzle. For the purpose of achieving an impact movement of the bit into outermost position relative to the axis of the cutting head, the pressurized fluid (in particular the pressurized liquid) is preferably supplied under a pressure of more than 200 bar, in particular a pressure between 300 and 750 bar.

The inventive apparatus for performing this process is based on a partial cut cutting machine having its cutting arm equipped with at least one cutting head being equipped with bits supported within bit holders for axial shifting movement over a limited stroke. Such known apparatuses were up until now used in such a manner that the bit penetrating into the rock moves a valve into its opened position and thus releases the supply of water to a nozzle. According to the invention, the arrangement is now such that the bit shafts each cooperate in a non-positive manner with a hydraulic or pneumatic cylinder-piston-aggregate for transmitting a pressure force outwardly shifting the bit against the action of the cutting force, the working space of said aggregate being in connection with a controllable source of pressurized fluid. The operating pressure of the source of pressurized fluid as well as the active cross section of the piston of the cylinder-piston-aggregate must thus be such that the bit can be pressed—thereby overcoming the axial component of the cutting force—into an outer position even if the bit is still engaging the rock to be excavated or, respectively, to be loosened.

In a preferred manner, the arrangement is such that the cylinder-piston-aggregate is designed as a valve, the valve shaft of which is cooperating in closing direction of the valve with the bit shaft in a force-coupled manner, in that the space upstream of the valve seat is connected with the controllable source of pressurized fluid and in that downstream of the valve seat a passage, in particular an ejection nozzle, is connected for connecting this space with an outlet opening in open position of the valve. When subjecting such a valve with pressurized liquid, for example water, the bit is suddenly moved in its outer position. As soon as the source of pressurized liquid is disconnected or made inoperative, an only minor leakage from the space upstream of the valve seat is sufficient for opening the valve under the action of the axial component of the cutting force, noting that liquid is displaced from the space located upstream of the valve seat during the opening stroke by the valve shaft. This liquid can, for example, be expelled via a spray nozzle. For facilitating opening movement under the action of the axial component of the cutting force, the space located upstream the valve seat can be connected via a throttle area with an exit opening, in particular the spraying nozzle. Such a throttle area facilitates lifting off of the valve from the valve seat under the action of the axial component of the cutting force as soon as the source of pressurized fluid is switched off.

For obtaining a rapid closing movement of the valve and thus a percussion movement of the bit, the valve shaft is, in an advantageous manner, guided within the valve housing in an at least substantially sealing manner, noting that the free cross section of the valve shaft multiplied by the operating pressure of the source of pressurized fluid and the added force of an optionally provided spring for forcing the valve in closing direction must result in a greater force than is the maximum cutting force acting in axial direction of the bit.

The controllable or switchable source of pressurized fluid must be designed for being intermittently made effective and ineffective, so that intermittent percussion work can be performed, and for this purpose the source of pressurized fluid is perferably in intermittent connection with the hydraulic cylinder-piston-aggregate via a rotary slide valve. Such an intermittently acting rotary slide valve can in a simple manner be realized such that the source of pressurized fluid is connected to a central axial bore within a part being stationary relative to the cutting arm and can be connected via a plurality of passages, opening in an essentially radial direction, with channels within a rotating part of the cutting head, said channels opening into the working space of the cylinder-piston-aggregate or, respectively, the space located upstream the valve seat. Such embodiments are constructed in an analogous manner as known sector controls in which exit of water is only possible over a predetermined center angle of a complete revolution of a cutting head and differ from such a sector control by the plurality of through-passages opening in radial direction. With consideration of any possible leakage of the valve, said radial through-passages can equally only be provided over a predetermined center angle of one revolution of the cutting head, this however, not being an imperative premise because with existing operating pressure of the source of pressurized fluid water can not emerge in a substantial amount on account of the valve being closed in this case.

When using pressurized air, intermittent supply of the pressurized fluid can directly be controlled by the piston acting on the bits. For this purpose, such an apparatus is preferably designed such that the pneumatic cylinder-piston-aggregate has a piston guided within a cylinder and having a greater diameter that has the part cooperating in a force-coupled manner with the bit, the mantle of said piston sliding during its stroke over a supply bore for pressurized air and over a relief bore connected to the working space of this piston, noting that an overflow channel between the working space of the piston and the annular space located at the side of the bit and to which the bore for pressurized air is connected is released if the relief bore has been closed. With such an embodiment, the piston is, after the bit has entered the rock, shifted for an amount which releases the supply bore for pressurized air. In the following the piston is subjected by the pressurized air in direction away from the bit, noting that air may escape from the working space of the piston as long as the relief bore has not yet become closed in preparing of the impact onto the bit. Reversal for the impace stroke of the piston is effected by the overflow channel between the working space of the piston and the annular space located at the side of the bit, to which annular space the supply bore for pressurized air is connected. To make sure that supply of pressurized air is obstructed as long as the bit is not engaging the rock, the arrangement is preferably such that the piston is maintained in engagement with the bit by means of a spring, the force of this spring being smaller than the reaction component of the cutting force and greater than the force corresponding to the weight of bit and piston.

Figure 3:
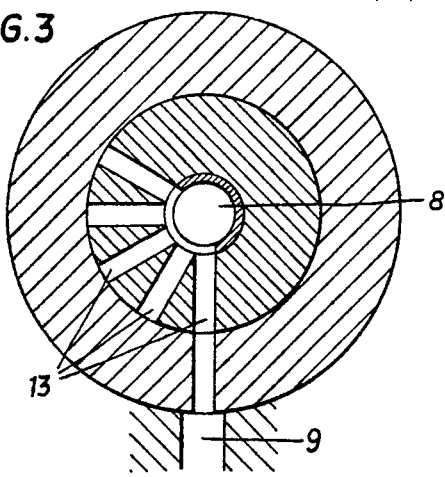

In the following, the invention is further explained with reference to an embodiment shown in the drawing. In the drawing, FIG. 1 shows a cross section through a cutting head to which bit holders and bits can be fixed, FIG. 2 shows a cross section through a bit holder comprising a hydraulic cylinder-piston-aggregate designed as a valve, FIG. 3 illustrates in an enlarged scale in a section along line III—III of FIG. 1 the intermittent control of the source of pressurized fluid and FIG. 4 in a section similar to that of FIG. 2 an embodiment operated by pressurized air.

Figure 1:
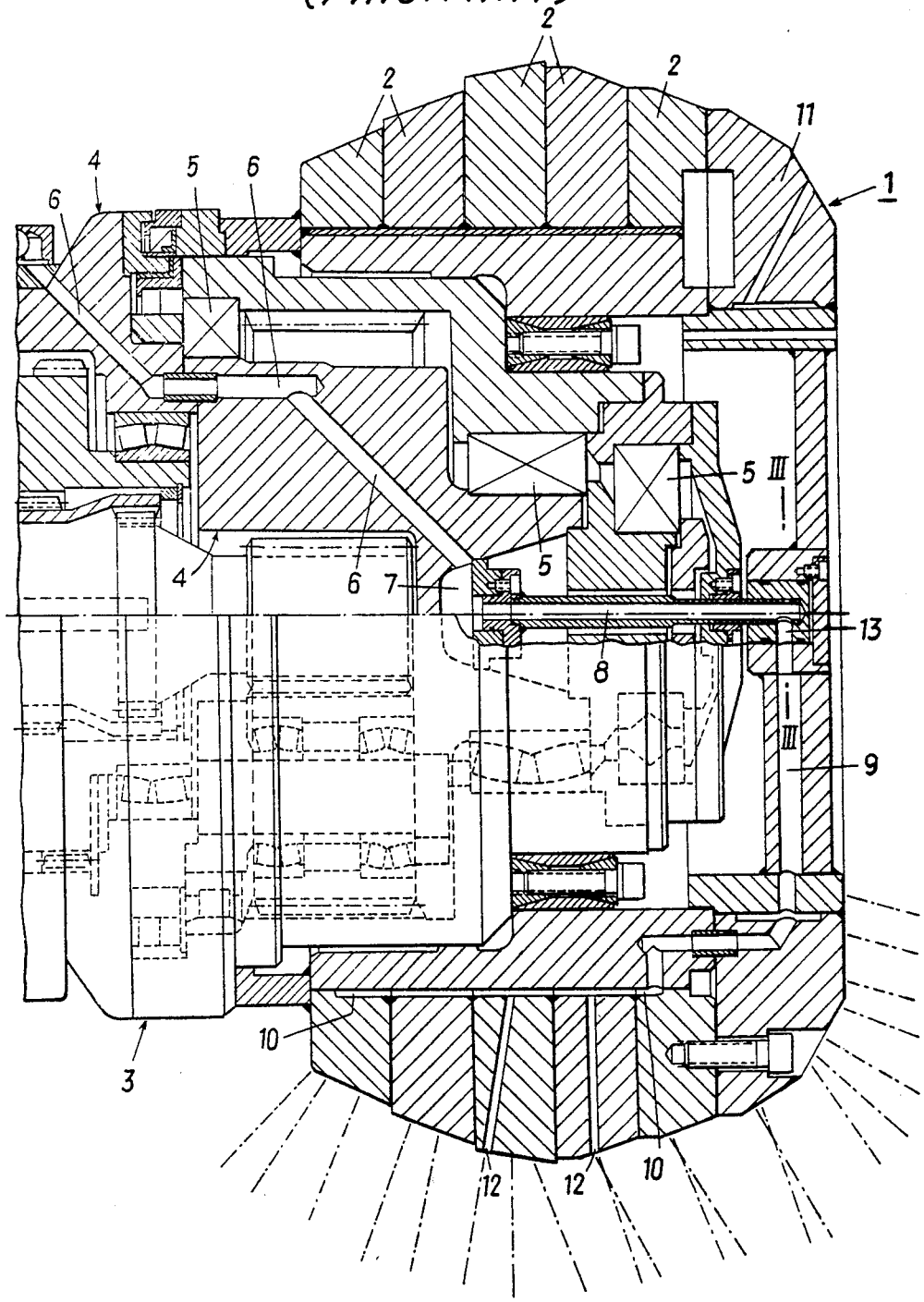

According to FIG. 1, the cutting head 1 is composed of mutually welded discs 2 and rotatably supported on a cutting arm not shown. The last stage of the reduction gearing is indicated in dashed lines and designated by 3. The cutting head 1 is supported by anti-friction bearings 5 on a carrier 4 connected with said cutting arm. Water is supplied via channels 6 provided within the carrier 4 and enters a distributing chamber 7 and then flows via a correspondingly sealed supply conduit 8 and radially conduits 9 into distributing cavities 10 extending in axial direction of the cutting head. The front plate 11 of the cutting head 1 is connected with the base member of the cutting head by means of screws. From the distributing cavities, the water flows via substantially radial bores 12 to the exit nozzles which may be housed in the bit holder.

The axial supply conduit 8 has at its front-side end a number of radial perforations 13 and the radial conduits 9 slide past these perforations 13 during rotation of the cutting head 1. This can be taken from the enlarged representation shown in FIG. 3.

FIG. 2 shows a bit holder 14. The supply conduit 12 for pressurized water opens into the foot of the bit holder 14. In case of a fracture of the bit holder 14, this opening can be closed by means of a plug 15, thus preventing an excessive water consumption. From the conduit 12, the water flows via a channel 16 provided in the bit holder 14 into the working space 17 of a hydraulic cylinder-piston-aggregate designed as a valve 18. This valve 18 has a valve shaft 19 designed as a piston and being sealingly guided within the valve housing 20. The valve housing 20 further has a valve seat 21 on which the valve member is seated in the closed position shown in FIG. 2. The valve member as well as the valve shaft 19 are forced in their respective closed positions by the pressurized fluid entering the working space 17 and the spring 22 becomes simultaneously effective in the same closing sense. The valve shaft 19 cooperates with the bit shaft 23 of a bit 24. The bit 24 can be shifted within a bushing 25 in axial direction and this in direction of the twin-arrow 26, the shifting movement being limited by the width a of the axial groove 27 within the bit shaft. For limiting the stroke of the bit 24 in the sense of the twin-arrow 26, a resilient ring 28 is arranged within the bushing and simultaneously secures the bit 24 from falling outward. The bushing 25 is secured within the bit holder 14 by means of a resilient pin 29.

In closed position of the valve 18, the bit 24 assumes its outwardly forced position. As long as pressurized fluid is present within the working space 17, i.e. within the space upstream or before the valve seat, the valve can not be opened by the cutting force even if the bit 24 penetrates the rock. The axial component of the cutting force is indicated by the arrow 30. As soon as the pressure within the space 17 is reduced, i.e. as soon as the source of pressurized fluid is shut off, liquid can flow out of the space 17 and via the throttle 31 to the nozzle 32 and the valve can be lifted off its valve seat. The axial component of the cutting force can now force the valve into open position, noting that the volume displaced from the space 17 can be pressed through the valve seat and via the channel 33 to the nozzle 32. The valve now remains in open position and the bit 24 remains in its inwardly shifted position as long as the source of pressurized fluid remains disconnected. As soon as the source of pressurized fluid is again connected, the valve is again forced in closed position against the action of the axial component of the cutting force acting on the bit, noting that water can flow during a short time span to the nozzle 32 via the valve seat and the channel 33. As soon as the valve 18 is again closed, liquid is not ejected in a substantial amount as long as the space 17 remains pressurized. In this stage, a slight leakage takes place only via the throttle 31. If the space 17 is again depressurized, liquid is again pressed from the space 17 to the nozzle via the channel 33, the valve thus again arriving in open position. By intermittently repeating this operation sequence, the bit 24 can be imparted a percussion movement in direction opposite to the direction 30 of the axial component of the cutting force.

The intermittent pressurizing of the space 17 with pressurized fluid is illustrated by the enlarged representation according to FIG. 3. On account of the rotating movement of the cutting head around the stationary axial supply conduit 8, the radial perforations 13 establish or interrupt the connection between the source of pressurized fluid with the bores 9 and thus with the space 17 before the valve seat of the valve in an intermittent manner like a rotary slide valve. In the representation of FIG. 3 the arrangement is shown as having the radial perforations 13 only provided within a center angle of approximately 120° of one rotation of the cutting head so that the space 17 before the valve seat is pressurized within that range only in which the bit 24 has to perform percussion cutting on account of engaging the rock.

Figure 4:
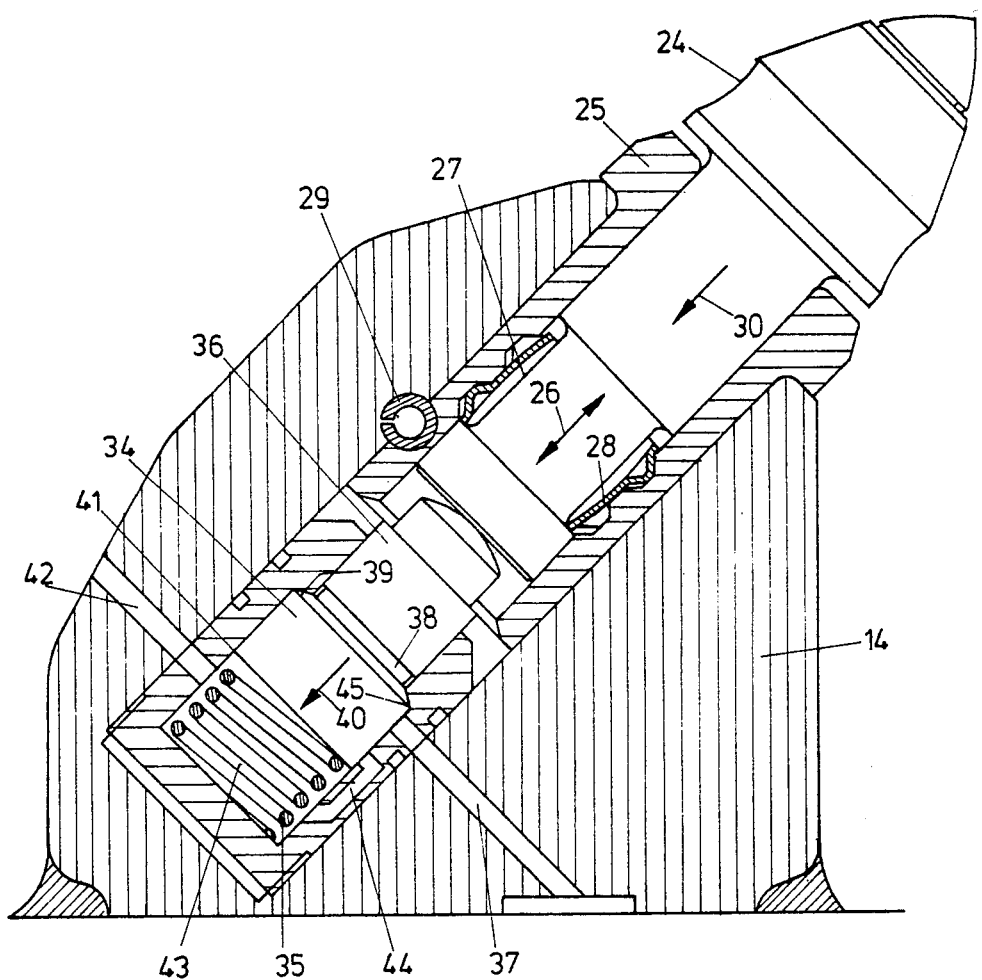

In FIG. 4 an embodiment is shown which is operated by pressurized air. The bit is again designated by 24 and axially shiftable in direction of the twin-arrow 26 within a bushing 25. Shifting movement is again limited by the width of the axial groove 22 within the bit shaft, noting that for limiting the stroke of the bit 24 a resilient ring 28 is arranged within the bushing and simultaneously secures the bit 24 against falling outward. The bushing 25 is again secured in position within the bit holder 14 by a resilient pin 29. A piston 34 is arranged adjacent as seen in axial direction and is maintained in contact with the bit shaft by means of a spring 35. The piston 34 has a reduced portion 36 cooperating with the bit 24 in a non-positive or force-coupled manner and slides in the representation selected in FIG. 4 over the supply bore 37 for pressurized air. Under the action of the reaction force acting in direction of the arrow 30, the piston 34 is, with the bit 24 having entered the rock, shifted to such an extent that the supply bore 37 for pressurized air is released. Pressurized air now enters via the bore 37 into the annular space 38 and acts on the annular surface 39 of the piston 34 in direction of the arrow 40. The lower egde 41 of the piston 34 slides subsequently over the relief bore 42, so that a pressure can be built up within the working space 43 of the piston 34. As soon as the upper edge 45 of the piston 34 has been slid past the overflow passage 44, pressurized air from the supply bore 37 enters the working space 43. On account of the cross sectional surface of the piston 34, which surface is acted upon in the closing sense, being substantially greater than the annular surface 38 acting in the opening sense, the piston 34 is rapidly moved in forward direction and hits the bit 24 during this movement. As soon as the lower edge 41 of the piston 34 again releases the relief bore 42, the pressure is reduced and the air pressure effective from the supply bore 37 for pressurized air is again in the position to shift the piston 34 in direction of the arrow 40.

If the bit travels out of the cutting area, the bit is maintained by the force of the spring 35 in its forward position in which the piston 34 closes the supply bore 37 for pressurized air, so that no pressurized air can enter the annular space 38.

What is claimed is:

1. A cutting assembly for a rock cutting machine comprising; a bit shaft inserted into and supported by a bit holder capable of limited axial movement; a valve positioned coaxially with the bit shaft whereby an axial cutting pressure on the bit shaft tends to open the valve; a means to intermittently supply fluid pressure to the valve thereby exerting an axial force on the bit shaft to urge the bit shaft against the cutting pressure.

2. A percussion cutting assembly for a rock cutting machine comprising a bit having a bit shaft inserted into and supported by a bit holder capable of limited axial movement, a valve seat and a cooperating valve having a valve shaft coaxially arranged with said bit shaft whereby axial cutting pressure on the bit and bit shaft causes the valve to move axially away from the valve seat and bit shaft, a means to intermittently supply fluid pressure to the valve thereby exerting an intermittent axial force against the valve sufficient to urge the bit against the cutting pressure and causing the valve to close against the valve seat.

3. A cutting assembly according to claim 1 wherein the fluid passing through the valve exits through a nozzle to direct a stream of fluid toward the bit.

4. A cutting assembly according to claim 1 wherein the fluid pressure is greater than 200 bar.

5. A cutting assembly according to claim 1 wherein the fluid pressure is between 300 and 750 bar.

6. A cutting assembly according to claim 1 where the valve shaft is guided within a valve housing in a substantially sealing manner.

7. A cutting assembly according to claim 1 wherein a spring engages the valve shaft urging the valve to its closed position.

8. A cutting assembly according to claim 7 wherein the fluid pressure combined with the force of the spring is greater than the maximum cutting pressure to urge the bit axially against the cutting pressure and to close the valve.

9. A cutting assembly according to claim 1 wherein the intermittent fluid pressure is produced by a rotary slide valve.

10. A cutting assembly according to claim 1 comprising a cutting arm supporting a rotating head, the head having a plurality of said bits, the cutting arm having a central axial fluid supply connected to a plurality of radially arranged conduits, the rotating head having a radially disposed fluid passage in communication with a workspace upstream of said valve capable of communication with the radially arranged conduits such that rotation of the head causes intermittent fluid flow from the axial supply to the workspace of the valve.

11. A percussion cutting assembly for a rock cutting machine comprising a bit having a bit shaft inserted into a supported by a bit holder capable of limited axial movement within the holder, a valve means comprising a piston capable of reciprocating within a cylinder in the bit holder, the cylinder and piston arranged coaxially with the bit shaft and one end of the piston in contact with the bit shaft, a work space within the cylinder at the end of the piston opposite the end contacting the bit shaft, a fluid supply passage in communication with the cylinder at a point where the passage is closed when the piston is in its extreme position at one end of the cylinder, a relief bore in communication with the work space, an overflow channel comprising a substantially U-shaped passage where each end of the passage is in communication with the cylinder and one end is in communication with the work space, the piston and cylinder arranged such that an axial cutting pressure on the bit causes the piston to move axially thereby allowing fluid pressure from the supply to act on the piston, the axial movement of the piston closing the relief passage from the work space, said axial movement of the piston further permitting communication of the supply passage to the overflow passage thereby exerting a fluid pressure against piston in the work space resulting in the piston and bit being urged axially against the cutting pressure.

12. A percussion cutting assembly according to claim 11 wherein a spring is provided in the work space to maintain the piston in contact with the bit shaft, the spring force being less than the cutting force and greater than the force corresponding to the weight of the piston and bit.

13. In a rotatable rock cutting head having a plurality of bits each having a longitudinal axis and mounted in the head for limited movement along said axis in inward and outward directions relative to the cutting head, the improvement comprising means for imparting to the bit reciprocating impact movement along said axis for facilitating loosening of rock from a mine face during a mining operation, said means including a fluid-operated piston and cylinder unit arranged coaxially with the bit, one end of said unit cooperating with the bit and the other end including a fluid pressure working space, and means for alternately pressurizing and relieving said working space with fluid pressure, the arrangement being such that the fluid pressure in said working space maintains the bit in an axially outward position in contact with the mine face during a cutting operation and such that, when the fluid pressure is relieved, the cutting force on the bit tends to move the bit in an axially inward direction, and fluid discharge means operable upon such relieved fluid pressure to discharge fluid from the working space sufficient to permit the cutting force to move the bit inwardly.

* * * * *